(12) United States Patent
Kakehi

(10) Patent No.: US 6,238,503 B1
(45) Date of Patent: May 29, 2001

(54) ULTRASONIC WELDING APPARATUS AND ULTRASONIC WELDING METHOD

(75) Inventor: Toshinori Kakehi, Toyohashi (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/437,384

(22) Filed: Nov. 10, 1999

(30) Foreign Application Priority Data

Nov. 12, 1998 (JP) .................................................. 10-321879

(51) Int. Cl.⁷ ...................................................... B32B 31/16
(52) U.S. Cl. ........................ 156/73.1; 156/285; 156/580.2
(58) Field of Search ................................... 156/73.1, 285, 156/580.1, 580.2; 264/442, 443, 445; 425/174.2

(56) References Cited

U.S. PATENT DOCUMENTS

| | | | |
|---|---|---|---|
| 5,622,579 | * | 4/1997 | Tobias .................................. 156/73.1 |
| 6,063,220 | * | 5/2000 | Andersson ........................... 156/73.1 |
| 6,149,755 | * | 11/2000 | McNichols ............................ 156/264 |

* cited by examiner

*Primary Examiner*—James Sells
(74) *Attorney, Agent, or Firm*—Edward D. Murphy

(57) ABSTRACT

To provide an ultrasonic welding apparatus of a simple structure which allows a plastic fastener to be automatically loaded into an ultrasonic horn, and to provide an ultrasonic welding method of high operational efficiency. An ultrasonic welding apparatus 1 includes an ultrasonic horn 3 holding a plastic stud 7 having a flange 5 and an engagement shank 6, and a body 2 to bring the flange of the stud 7 held by the ultrasonic horn into contact with a workpiece, so that the flange 5 is ultrasonic-welded onto the workpiece. The ultrasonic welding apparatus further includes a stud receiving member 10 to receive the plastic stud 7 in the manner that the flange is advanced ahead from a feeding tube 9; and a moving mechanism (a first arm 19, a first arm cylinder 21, a second arm 23, a second arm cylinder 25, and the like) to move the stud receiving member 10 to a position below the ultrasonic horn 3. The moving mechanism can move the engagement shank 6 of the plastic stud 7 in the stud receiving member 10 to a position adjacent to a housing portion 30 of the ultrasonic horn 3. The stud receiving member is formed with a recess 11 to seat the flange 5 therein. Negative pressure is applied to the seating recess 11 to vacuum-tack the flange. The rim of the seating recess is formed in a sloping configuration so that the flange can be positioned in the center of the seating recess.

5 Claims, 6 Drawing Sheets

ULTRASONIC WELDING APPARATUS AND ULTRASONIC WELDING METHOD

BACKGROUND OF THE INVENTION

The present invention relates to an ultrasonic welding apparatus including an ultrasonic horn for holding an engagement portion of a plastic fastener such as a plastic stud or a plastic clip, the plastic fastener having a flange to be welded onto a workpiece and the engagement portion extending from the flange, wherein the flange of the plastic fastener held by the ultrasonic horn is brought into contact with workpiece and ultrasonic energy is applied to the ultrasonic horn so that the plastic fastener is ultrasonically welded onto the workpiece. The present invention further relates to an ultrasonic welding method for a plastic fastener.

It is already commonly practiced to weld, by using ultrasonic energy, a plastic fastener such as a plastic stud or a plastic clip which has a flange to be welded onto a workpiece such as a plastic panel and an engagement portion extending from the flange. One known ultrasonic welding apparatus includes an ultrasonic horn for holding the engagement portion of the plastic fastener, and means for bringing the flange of the fastener held by the ultrasonic horn into contact with the workpiece, wherein ultrasonic energy is applied to the ultrasonic horn so that the flange of the plastic fastener is welded onto the workpiece.

In a conventional ultrasonic welding apparatus, an engagement portion of the plastic fastener is manually inserted into the tip of the ultrasonic horn so that the ultrasonic horn can hold the engagement portion of the plastic fastener. Alternatively, in the case of automatic loading, the ultrasonic horn is moved to a location where the plastic fastener has been fed for loading there. However, as it is troublesome to load the fasteners one by one, such loading operations are not efficient. Particularly, for loading a plastic fastener to the ultrasonic horn, it is necessary to securely locate the engagement portion of the plastic fastener in the tip of the ultrasonic horn. In order to make manual loading quickly, it is also necessary to master such a skill. In automatic loading, the mechanism for moving the ultrasonic horn may become complex.

Therefore, it is an object of the present invention to provide an ultrasonic welding apparatus of a simple structure that allows automatic loading of a plastic fastener to an ultrasonic horn, and to provide an ultrasonic welding method with high efficiency in its operation.

SUMMARY OF THE INVENTION

To accomplish above object, according to the present invention, there is provided an ultrasonic welding apparatus including an ultrasonic horn for holding an engagement portion of a plastic fastener such as a plastic stud, the plastic fastener having a flange to be welded onto a workpiece and the engagement portion extending from the flange; and means for bringing the flange of the plastic fastener held by the ultrasonic horn into contact with the workpiece, wherein ultrasonic energy is applied to the ultrasonic horn so that the flange of the plastic fastener is ultrasonic welded onto the workpiece. The ultrasonic welding apparatus comprises: fastener feeding means for feeding a plastic fastener to load it into the ultrasonic horn; fastener receiving means for receiving the fastener of which flange is advanced first from the fastener feeding means; and moving means for moving the fastener receiving means to a position beneath the ultrasonic horn; the moving means being capable of moving the engagement portion of the fastener in the fastener receiving means to a position adjacent to a engagement portion support of the ultrasonic horn, the fastener receiving means being formed with a recess to seat the flange therein, the seating recess being adapted to be supplied with negative pressure air to vacuum-retain or tack the flange, the seating recess having a rim formed in a sloping configuration so that the flange can be positioned in the center of the seating recess.

As described above, since the seating recess of the fastener receiving means which receives the plastic fastener fed from the fastener feeding means is formed in a sloping configuration, and negative pressure air is supplied to the seating recess to vacuum-tack the flange, the flange is positioned at the center of the seating recess. Thus, the flange is very precisely and securely positioned on the fastener receiving means, so the position of the flange will never be shifted even when the fastener receiving means is moved by the moving means. As the plastic fastener can be securely and precisely positioned on the ultrasonic horn only by the movement of the fastener receiving means through the moving means, it can be automatically loaded into the ultrasonic horn.

According to the present invention, there is also provided an ultrasonic welding method including steps of holding an engagement portion of a plastic fastener such as a plastic stud or a plastic clip, the plastic fastener having a flange to be welded to a workpiece and the engagement portion extending from the flange in an ultrasonic horn; and then bringing the flange of the plastic fastener into contact with the workpiece so that the flange is ultrasonically welded onto the workpiece. The welding method comprises the steps of: feeding the plastic fastener to a fastener receiving means in a manner that the fastener is advanced with the flange leading from a fastener feeding means; seating the flange of the fastener in a seating recess of the fastener receiving means, the seating recess having a rim formed in a sloping configuration, and then, vacuum-retaining or tacking the flange of seated fastener by negative pressure air; moving the fastener receiving means to a position adjacent to the tip of ultrasonic horn; vacuum-retaining or tacking the engagement portion of the fastener held by the fastener receiving means into the ultrasonic horn so that the fastener is held by the ultrasonic horn; returning the fastener receiving means back to a fastener receiving position where the fastener is received from the fastener feeding means; ultrasonically welding the flange of the fastener onto the workpiece, while bringing the flange of the fastener held by the ultrasonic horn into contact with the workpiece; and after welding, returning the ultrasonic horn back to it's home position where it is lifted up from the workpiece; and wherein the method further includes, between the step of returning the fastener receiving means and the step of returning the ultrasonic horn, a step of feeding a next fastener in the manner that the flange thereof is advanced ahead to the fastener receiving means which has been returned back to the fastener receiving position. According to such method, not only an ultrasonic welding apparatus of a simple structure is obtained, but also the next fastener is held by the fastener receiving means during ultrasonic welding operation of previous fastener, whereby fastener feeding time in the next ultrasonic welding operation can be reduced and the operational efficiency can be increased.

According to the present invention, since the flange of the plastic stud is very precisely and securely located with a simple structure, the position of the fastener will never be shifted even when the fastener receiving means is moved by it's moving mechanism, and since the plastic fastener can be securely and precisely located in the ultrasonic horn only through the movement of the fastener receiving means, the plastic fastener can be automatically loaded into the ultrasonic horn. Furthermore, according to the present invention, since a next plastic fastener is held in the fastener receiving means during ultrasonic welding operation of previous plastic fastener, the fastener feeding time in the next operation can be reduced and therefore the operational efficiency can be increased.

BRIEF DESCRIPTION OF THE ACCOMPANYING DRAWINGS

FIGS. 6(A) and (B) show the operations of the ultrasonic welding apparatus according to the present invention, (A) shows the steps of the standard ultrasonic welding method, and (B) shows the steps of the ultrasonic welding method according to the present invention.

DETAILED DESCRIPTION OF THE INVENTION

Figure 1:
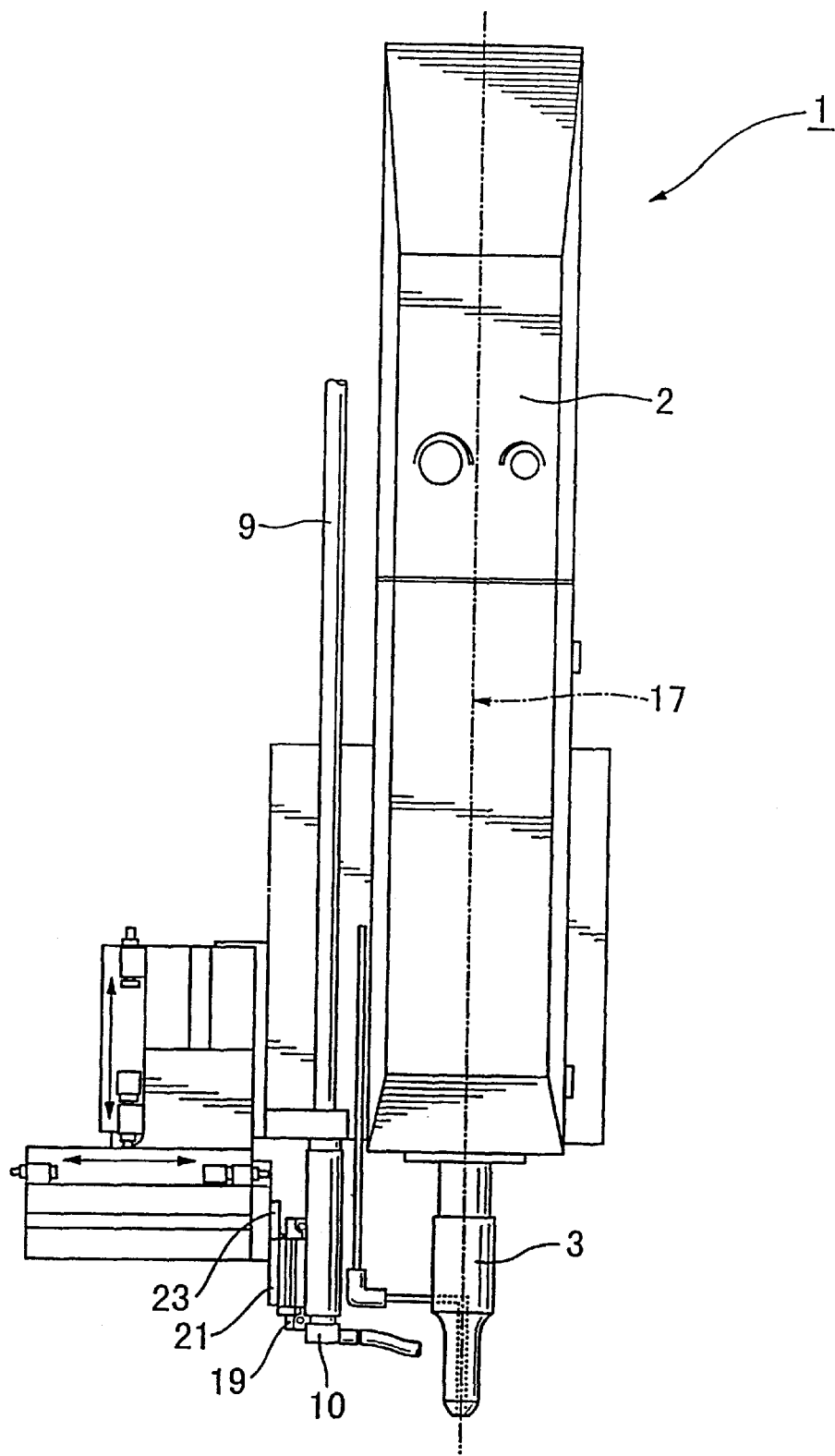
FIG. 1 is a front view of an ultrasonic welding apparatus according to the present invention.
Figure 2:
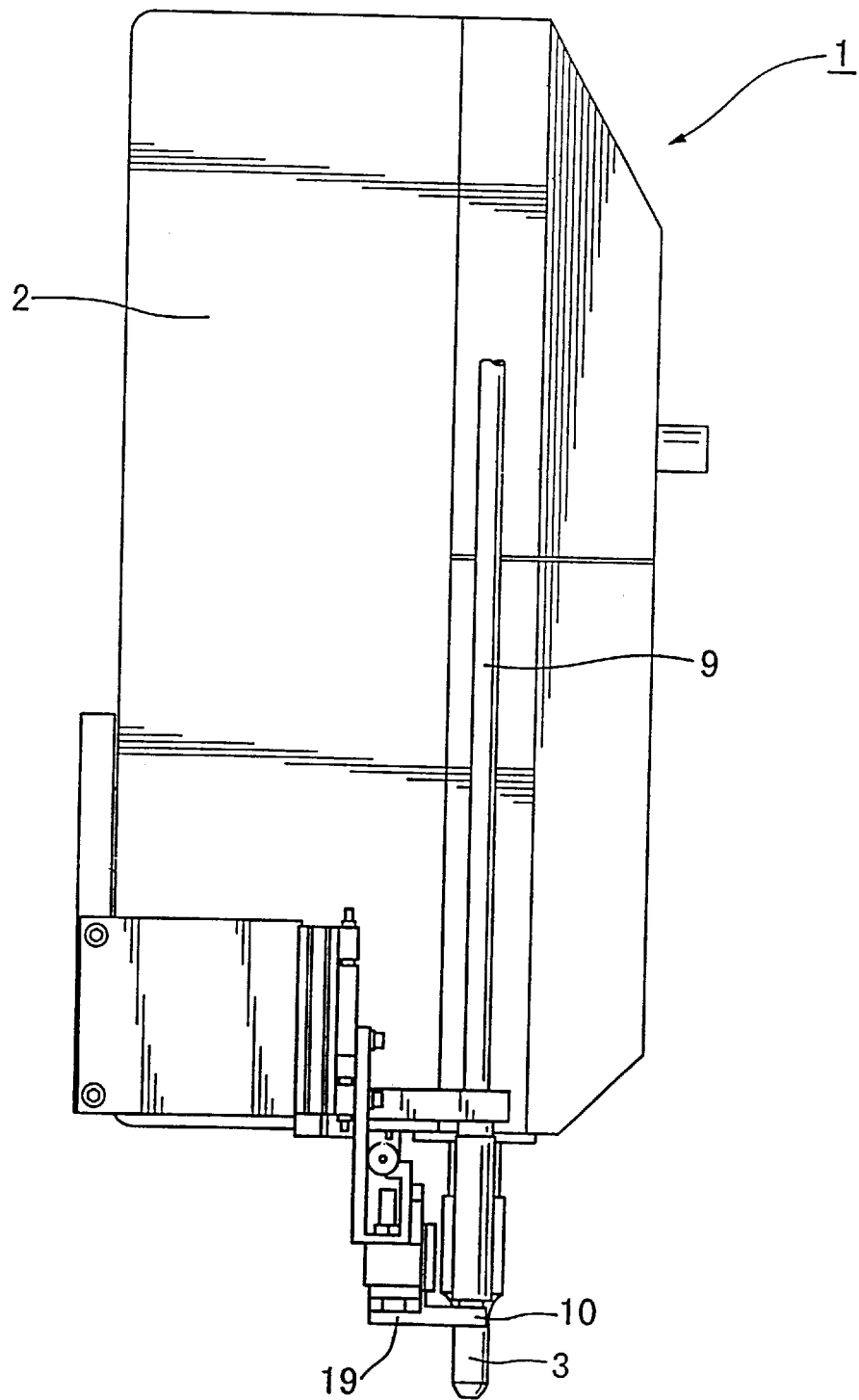
FIG. 2 is a left side view of the ultrasonic welding apparatus in FIG. 1.

Referring to the drawings, an ultrasonic welding apparatus 1 according to the embodiment of the present invention will now explained. In FIGS. 1 and 2, the ultrasonic welding apparatus 1 includes a stationary body 2 extending in the vertical direction, referred as a so called ultrasonic press, and a movable ultrasonic horn 3 extending downward from a bottom of the body 2. A plastic fastener such as a plastic stud or a plastic clip is held by the ultrasonic horn 3. The body 2 moves the ultrasonic horn 3 down to bring the flange of the plastic fastener held by the ultrasonic horn 3 into contact with a workpiece such as a plastic panel. Then, the body pushes strongly the plastic fastener against the workpiece, and applies ultrasonic energy to the ultrasonic horn 3 so that the plastic fastener is ultrasonically welded onto the workpiece. Because the mechanism of ultrasonic welding is well known, it's detailed description will be omitted.

Figure 3:
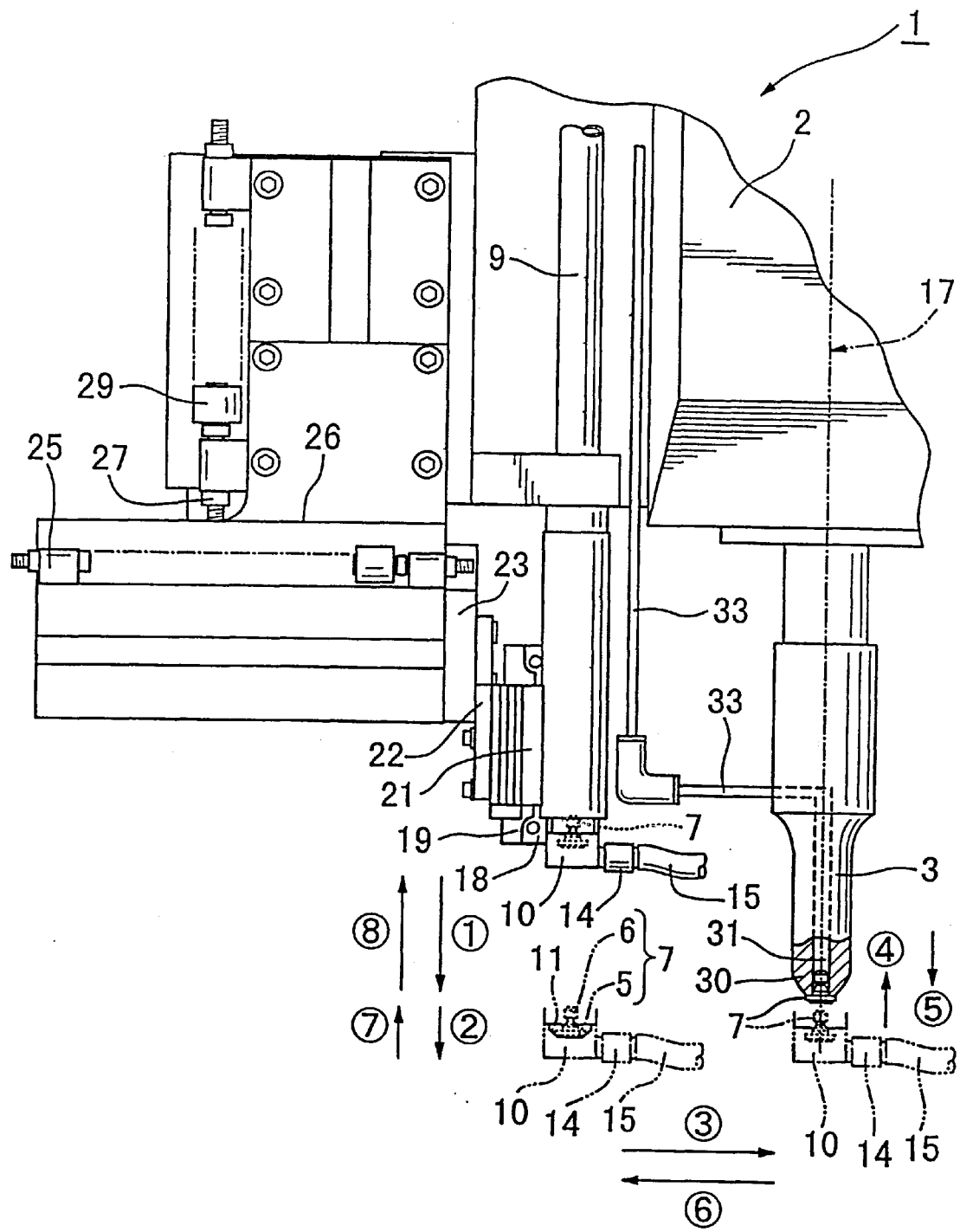
FIG. 3 is a front view of a main portion, including the ultrasonic horn, of the ultrasonic welding apparatus in FIG. 1.
Figure 4:
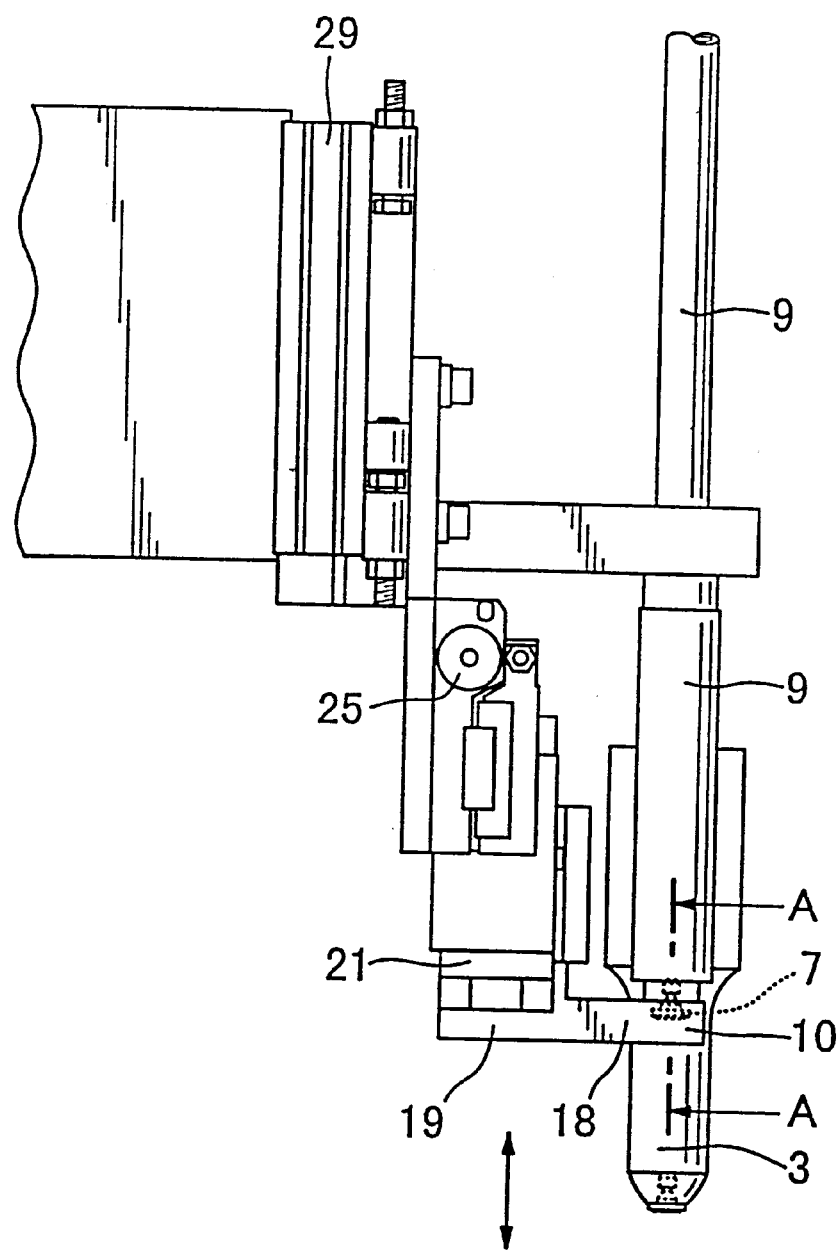
FIG. 4 is a left side view of the portion of the apparatus in FIG. 3.
Figure 5:
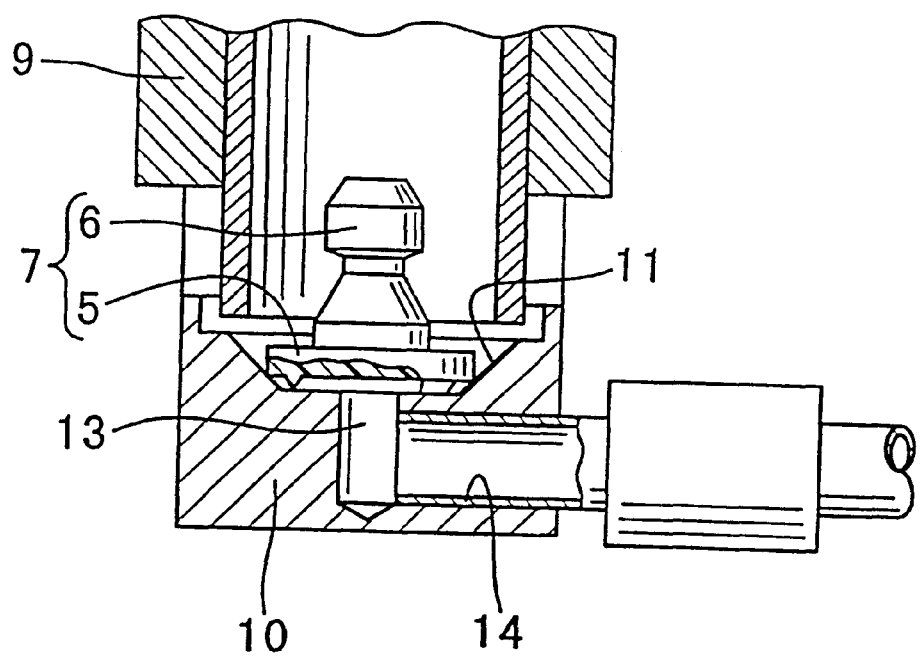
FIG. 5 is a sectional view of the portion of the apparatus taken along the line A—A in FIG. 4.

The ultrasonic welding apparatus 1 according to the present invention comprises a mechanism for automatically loading the plastic fastener into the ultrasonic horn 3. Referring to FIGS. 3–5 in addition to FIGS. 1 and 2, an embodiment according to the present invention will be explained. As shown in FIGS. 3 and 5, for the purpose of illustration, in this embodiment, a plastic stud 7 comprising a flange 5 of a large diameter, and an engagement shank 6 extending vertically from the flange 5 is used as a plastic fastener. This plastic stud 7 is referred as an I-stud because of it's engaging shank 6 having an I-shape, and it is welded onto a workpiece such as panel, and after being welded, it is used for holding either a component directly or a clip for holding the component. Although the plastic stud is used in this embodiment, another type of plastic fastener such as a plastic clip may be used. The ultrasonic welding apparatus 1 is provided with a mechanism for automatically loading a plastic stud 7 into the ultrasonic horn 3 The automatically loading mechanism comprises a feeding tube 9 for pneumatically feeding the plastic stud 7 in the manner that it's flange 5 is advanced ahead to load it into the ultrasonic horn 3, a stud receiving member 10 for receiving plastic stud 7 in the manner that it's flange 5 is advanced ahead from the feeding tube 9, and a moving mechanism for moving the stud receiving member 10 to a position beneath the ultrasonic horn 3.

Details of the feeding tube 9 and the stud receiving member 10 will now be explained. The plastic studs 7 are stored loosely in a supply container (not shown). The supply container is connected to an escapement mechanism (not shown) which serves to align the plastic studs 7 next to each other so as to feed them one by one in such a manner that the flange 5 is advanced first. The feeding tube 9 is connected to an output of the escapement mechanism. The feeding tube 9 is supplied with pressurized air, the feeding tube receives the plastic stud 7 one by one in the manner that it's flange 5 is advanced ahead from the escapement mechanism, and feeds it the stud receiving member 10. The operation of feeding the plastic stud to the stud receiving member 10 can be adjusted by controlling supply and shut off of pressurized air. As shown in FIG. 5, the stud receiving member 10 has a recess 11 formed to seat the flange 5 therein. This seating recess 11 has a rim formed in a sloping configuration, which stabilizes seating of the flange 5 of the plastic stud 7, and also positions the flange 5 in the center of the seating recess 11. Furthermore, a hole 13 is made at the center of the seating recess 11, and a tube portion 14 communicating with the hole 13 is connected to a pipe 15 extending from a compressor (not shown) which supplies negative pressure air. Thus, the flange 5 of the plastic stud 7 to be fed to the stud receiving member 10 is probably held in alignment with the center of the seating recess 11 by vacuum-tacking, whereby the flange 5 will never be shifted due to oscillation or vibration induced by the movement of the stud receiving member 10. Furthermore, the timing of this vacuum-tacking is controlled in timed relationship with the timings between the receiving of the plastic stud 7 from the feeding tube 9 and the delivering of the same to the ultrasonic horn 3.

Now, explanation is continued on the moving mechanism for moving the stud receiving member 10 to a position beneath the ultrasonic horn 3 so that the ultrasonic horn 3 can hold the plastic stud 7. The moving mechanism comprises a first arm 19 being capable of moving in the vertical direction parallel to an axis 17 of the ultrasonic horn 3 and having a tip 18 connected to the stud receiving member 10; a first arm cylinder 21 for moving the first arm 21 in the axial direction of the ultrasonic horn 3; a second arm 23 being capable of moving in the horizontal direction perpendicular to the axis 17 of the ultrasonic horn 3 and having a tip 22 connected to the first arm cylinder 21; and a second arm cylinder 25 for moving the second arm 23 in the horizontal direction perpendicular to the axis 17 of the ultrasonic horn 3 and moving the stud receiving member 10 to a position beneath the ultrasonic horn 3. This moving mechanism also includes a third arm 27 which is capable of moving in the vertical direction parallel to the axis 17 of the ultrasonic horn 3 and has a tip 26 connected to the second arm cylinder 25; and a third arm cylinder 29 for moving the third arm 27 in the vertical direction parallel to the axis 17 of the ultrasonic horn 3 and therefore moving the stud receiving member 10. The combination of the third arm 27 and the third arm cylinder 29 has the same function as that of the first arm 19 and the first arm cylinder 21, in a point that they move the stud receiving member 10 in the vertical direction. However, the movement lengths of the first arm 19 and the first arm cylinder 21 can be extended, so that they are used to move the stud receiving member 10 largely in the vertical direction. The moving mechanism comprising the first arm 19, the first arm cylinder 21, the second arm 23, the second arm cylinder 25, the third arm 27 and the third arm cylinder 29 actuates such that, in the order of arrows 1) to 8) in FIG. 3, the stud receiving member 10 is moved to a position beneath the ultrasonic horn 3 from a plastic stud receiving position so that the plastic stud 7 is held by the ultrasonic horn 3, and then the stud receiving member 10 that became empty is returned back to the stud receiving position.

The tip of the ultrasonic horn 3 is formed with a containing portion 30 for receiving and holding the engagement shank 6 of the plastic stud 7. In order to vacuum-tack the engagement portion 6 of the plastic stud 7 held by the stud receiving member 10 as moved down, an air passage 31 extends into the containing portion 30. The air passage 31 is connected to an external pipe 33 to which negative pressure air is supplied from a compressor or the like. The timing of supplying negative pressure air to the containing portion 30 is controlled in timed relationship with the timings of receiving the plastic stud 7 from the stud receiving member 10 and of supporting it within the containing portion 30. The air passage 31 in the containing portion 30 may also be used for exhausting of cooling air after the plastic stud is welded. In such a case, cooling pressurized air is supplied from a pipe 33. Thus, the pipe 33 is preferably provided with a mechanism to which negative pressure air or cooling pressurized air is selectively supplied.

Referring mainly to FIG. 3 and additionally to operational charts shown in FIGS. 6(A) and (B), explanation is made on the operation of the ultrasonic welding apparatus 1 having above structure. First, referring to FIG. 6(A), one example of typical welding operations will be explained. In step a), the plastic stud 7 is fed from the feeding tube 9 to the stud receiving member 10 with its flange 5 being advanced ahead by pressurized air. In step b), negative pressure air is supplied to the stud receiving member 10 to vacuum-tack the flange 5 within the seating recess 11 (see also FIG. 5). As a result, the plastic stud 7 is held in the seating recess 11 so that the center of the plastic stud 7 is in alignment with the center of the recess 11. In step c), the stud receiving member 10 is moved to a position beneath the containing portion 30 on the tip of the ultrasonic horn 3. This movement is such that the third arm cylinder 29 is actuated to move the third arm 27 in a vertical direction parallel to the axis 17 of the ultrasonic horn 3. Thus, as shown by arrow (1) in FIG. 3, the stud receiving member 10 is moved down together with the plastic stud 7 as held, and then the First arm cylinder 21 is actuated to move the first arm 19 in the vertical direction as shown by arrow (2) in FIG. 3, thereby to move the stud receiving member 10 down. Next, the second arm cylinder 25 is actuated to move the second arm 23 in the horizontal direction perpendicular to the axis 17 as shown by arrow (3) in FIG. 3. Thus, the stud receiving member 10 is moved beneath the ultrasonic horn 3. By reversing the movement of the first arm cylinder 21 (or in a case of returning it by spring biasing, by stopping the actuation thereof), the stud receiving member 10 is lifted up shown arrow (4) to move the engagement shank 6 of the plastic stud 7 into the seating recess 11 to a position adjacent to the containing portion 30 of the ultrasonic horn 3.

Then, supplying of negative pressure air to the seating recess 11 is stopped and then negative presser air begins to be supplied to the air passage 31 from the pipe 33. In step d) in FIG. 6, the engagement portion 6 of the plastic stud 7 within the stud receiving member 10 is vacuum-tacked to the containing portion 30 of the ultrasonic horn 3, so the plastic stud 7 is securely held by the containing portion 30. After the plastic stud 7 is held by the ultrasonic horn 3, the first arm cylinder 21 is again actuated in the positive direction (or restart the actuation as previously stopped) to move the first arm 19 down so that the empty stud receiving member 10 is moved down as shown in arrow 5) in FIG. 3. Next, the stud receiving member 10 is moved in the direction of arrow 6) in FIG. 3 by actuating the second arm cylinder 25, and then the stud receiving member 10 is returned back to a position where next plastic stud is received, that is, it's home position by actuating both the first arm cylinder 21 and the third arm cylinder 29, as shown by arrow 7) and 8) in FIG. 3. This operation is indicated by step e) in FIG. 6 (A). In step f), the ultrasonic horn 3 is moved down by actuating the body 2 so as to bring the flange 5 of the plastic stud 7 held by the tip of the containing portion 30 into contact with the workpiece such as plastic panel, and the stud is pressed against the workpiece. Further, supplying of negative pressure air to the ultrasonic horn 3 is stopped. In step g), ultrasonic energy is applied to the ultrasonic horn 3 to cause ultrasonic vibration at the boundary between the flange 5 and the workpiece to weld each other. After welding, cooling pressurized air is preferably sent to the air passage 31 to cool the welded portion. After cooling, as shown in step h), the ultrasonic horn 3 is lifted up for preparation for the next welding operation. As shown in step i), feeding of the plastic stud is restarted for the next stud welding operation.

Figure 6:
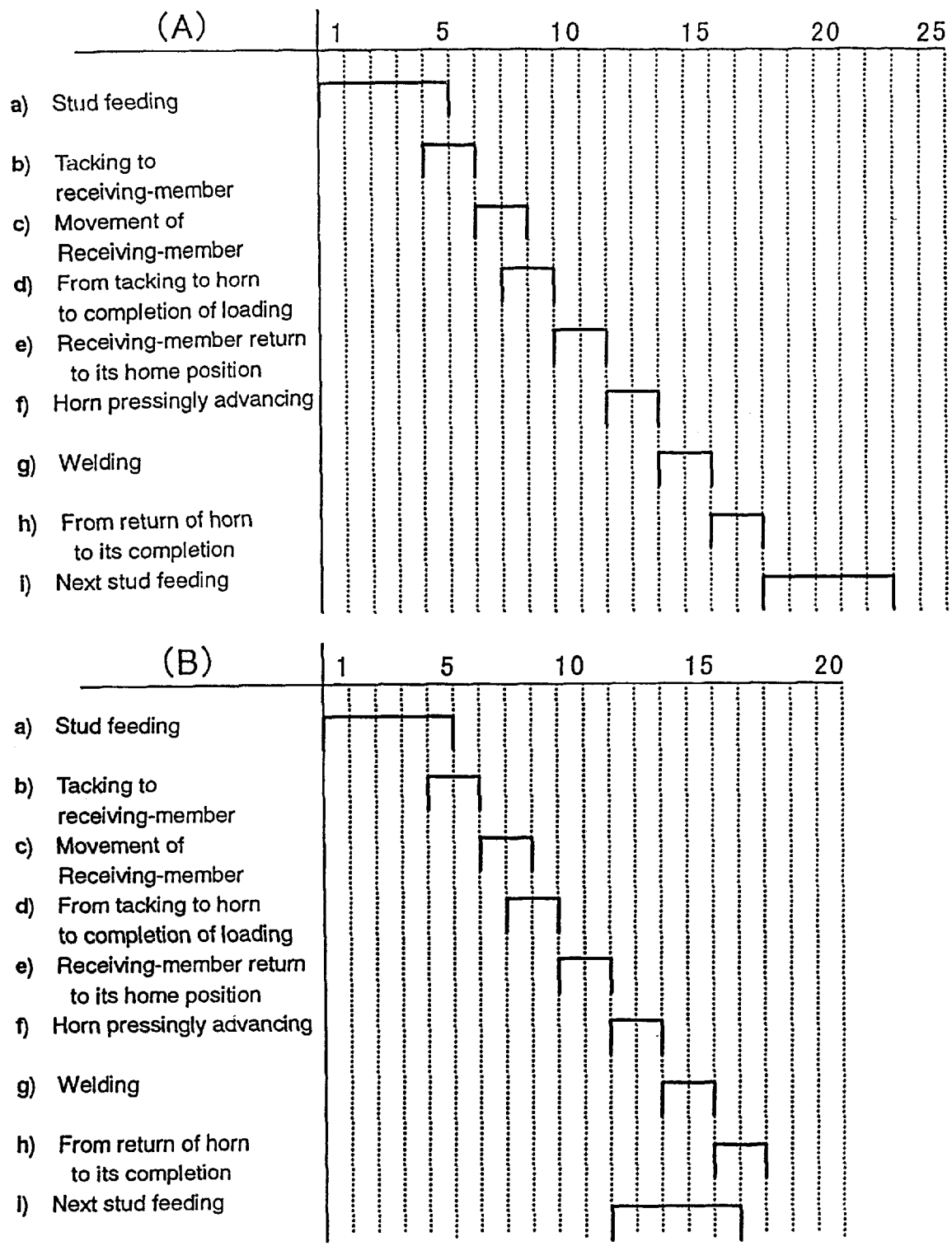

FIG. 6 (B) shows an embodiment of the ultrasonic welding method according to the present invention. In FIG. 6(B), the procedure of the steps a)–h) is same as that of the steps a)–h) in FIG. 6(A). That is, in step a) in FIG. 6(B), the plastic stud 7 is fed from the feeding tube 9 to the stud receiving member 10 in the manner that flange 5 is advanced ahead. In step b), the flange 5 is held in the stud receiving member 10 by negative pressure air. In step c), the stud receiving member 10 is moved to a position beneath the tip of the containing portion 30 of the ultrasonic horn 3 by actuating the first arm cylinder 21, the second arm cylinder 25 and the third arm cylinder 29. In step d), the plastic stud 7 within the stud receiving member 10 is vacuum-tacked into the housing 30 of the ultrasonic horn 3 and held therein. In step e), the stud receiving member 10 is returned back to the location where next plastic stud is received, namely, it's home position. In step f), the ultrasonic horn 3 brings the flange 5 of the plastic stud 7 into contact with the workpiece and pushes it against the workpiece. In step g), ultrasonic energy is applied to the ultrasonic horn 3 to accomplish welding operation. After welding, in step h), the ultrasonic horn 3 is lifted up for preparation for the next welding operation. The procedure described above is same as that of steps a)–h) in FIG. 6(A).

In FIG. 6(B), between the completion of the step (e) of returning the stud receiving member 10 and the mid point of the step (h) of returning the ultrasonic horn 3, there is the step i) of feeding next plastic stud 7 in the manner that it's flange 5 is advanced ahead to the stud receiving member 10 returned back to it's stud receiving position. In FIG. 6(A), this plastic stud feeding step i) is performed after the completion of the ultrasonic horn returning step h). According to the method in FIG. (B), the step i) in FIG. (A) corresponding to the fastener feeding time of next operation can be shortened or reduced, and therefore the operational efficiency can be increased. This is because that the plastic stud 7 can be automatically loaded by the ultrasonic welding apparatus of the present invention, and the next plastic stud can be held in the stud receiving member 10 during welding operation of the previous plastic stud.

What is claimed is:

1. An ultrasonic welding method including steps of holding an engagement portion of a plastic fastener such as a plastic stud or a plastic clip, the plastic fastener having a flange to be welded to a workpiece and the engagement portion extending from the flange in an ultrasonic horn; and then bringing the flange of the plastic fastener into contact with the workpiece so that the flange is ultrasonic-welded onto the workpiece, the welding method comprising steps of;

feeding the plastic fastener to a fastener receiver in a manner that the flange is advanced ahead from a fastener feeder;

seating the flange of the fastener in a seating recess of the fastener receiver, the seating recess having a rim formed in a sloping configuration, and then, vacuum-tacking the flange of seated fastener by negative pressure air;

moving the fastener receiver to a position adjacent to the tip of ultrasonic horn;

vacuum-tacking the engagement portion of the fastener held by the fastener receiver into the ultrasonic horn so that the fastener is held by the ultrasonic horn;

returning the fastener receiver back to a fastener receiving position where the fastener is received from the fastener feeder;

ultrasonic-welding the flange of the fastener onto the workpiece, while bringing the flange of the fastener held by the ultrasonic horn into contact with the workpiece; and after welding, returning the ultrasonic horn back to it's home position where it is lifted up from the workpiece; and wherein the method further includes, between the step of returning the fastener receiver and the step of returning the ultrasonic horn, a step of feeding a next fastener in the manner that the flange thereof is advanced ahead to the fastener receiver which has been returned back to the fastener receiving position.

2. An ultrasonic welding apparatus including an ultrasonic horn for holding an engagement portion of a plastic fastener such as a plastic stud, the plastic fastener having a flange to be welded onto a workpiece and the engagement portion extending from the flange; and means for bringing the flange of the plastic fastener held by the ultrasonic horn into contact with the workpiece, wherein ultrasonic energy is applied to the ultrasonic horn so that the flange of the plastic fastener is ultrasonic welded onto the workpiece, the welding apparatus comprising:

fastener feeder for feeding a plastic fastener to load it into the ultrasonic horn;

fastener receiver for receiving the fastener of which flange is advanced ahead from the fastener feeder; and arm structure for moving the fastener receiver to a position beneath the ultrasonic horn, the arm structure being capable of moving the engagement portion of the fastener in the fastener receiver to a position adjacent to an engagement portion support of the ultrasonic horn, the fastener receiver being formed with a recess to seat the flange therein, the seating recess being adapted to be supplied with negative pressure air to vacuum-tack the flange, the seating recess having a rim formed in a sloping configuration so that the flange can be positioned in the center of the seating recess.

3. An ultrasonic welding apparatus of claim 2, wherein the arm structure for the fastener receiver comprises a first arm adapted to move parallel to an axis of the ultrasonic horn, the first arm having a tip connected to the fastener receiver; a first arm cylinder for moving the first arm in the direction of the axis of the ultrasonic horn; a second arm adapted to move in the direction perpendicular to the axis of the ultrasonic horn, the second arm having a tip connected to the first arm cylinder; and a second arm cylinder for moving the second arm in the direction perpendicular to the axis of the ultrasonic horn and for moving the fastener receiver to a position beneath the ultrasonic horn.

4. An ultrasonic welding apparatus of claim 3, wherein a portion of the ultrasonic horn that holds the engagement portion of the fastener is formed with an air passage which is supplied with negative pressure air to vacuum-tack the engagement portion of the fastener.

5. An ultrasonic welding apparatus of claim 4, wherein after supply of negative pressure air is stopped, pressurized air is supplied to the air passage for cooling the welded portion.

* * * * *